United States Patent
Liu et al.

(10) Patent No.: US 11,864,112 B2
(45) Date of Patent: Jan. 2, 2024

(54) APPARATUS, METHOD AND COMPUTER PROGRAM

(71) Applicant: Nokia Technologies Oy, Espoo (FI)

(72) Inventors: Jianhua Liu, Shanghai (CN); Jing He, Beijing (CN); Chunli Wu, Beijing (CN); Benoist Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 235 days.

(21) Appl. No.: 17/426,257

(22) PCT Filed: Feb. 2, 2019

(86) PCT No.: PCT/CN2019/074627
§ 371 (c)(1),
(2) Date: Jul. 28, 2021

(87) PCT Pub. No.: WO2020/155156
PCT Pub. Date: Aug. 6, 2020

(65) Prior Publication Data
US 2022/0104129 A1    Mar. 31, 2022

(51) Int. Cl.
*H04W 52/02* (2009.01)
*H04W 74/08* (2009.01)
*H04W 76/28* (2018.01)

(52) U.S. Cl.
CPC ....... *H04W 52/0229* (2013.01); *H04W 74/08* (2013.01); *H04W 76/28* (2018.02)

(58) Field of Classification Search
CPC .. H04W 52/0229; H04W 76/28; H04W 74/08

USPC .......................................................... 370/311
See application file for complete search history.

(56) References Cited

U.S. PATENT DOCUMENTS

| | | | |
|---|---|---|---|
| 2006/0287008 A1 | 12/2006 | Twitchell, Jr. | |
| 2010/0077234 A1 | 3/2010 | Das | 713/300 |
| 2018/0077688 A1 | 3/2018 | Yi et al. | 72/42 |
| 2018/0146430 A1 | 5/2018 | Yadav et al. | |
| 2022/0183102 A1* | 6/2022 | Feuersaenger | H04W 52/0216 |

FOREIGN PATENT DOCUMENTS

| CN | 101155355 A | 4/2008 |
|---|---|---|
| CN | 104205993 A | 12/2014 |
| CN | 106301697 A | 1/2017 |

(Continued)

OTHER PUBLICATIONS

R2-1817181 (Year: 2018).*

(Continued)

*Primary Examiner* — Intekhaab A Siddiquee
(74) *Attorney, Agent, or Firm* — Harrington & Smith

(57) ABSTRACT

There is provided an apparatus, said apparatus including circuitry for operating in a first discontinuous reception mode including at least one awake period and at least one sleep period, receiving, during operation in the at least one awake period, a first indication from a network to perform at least one of pausing operation of the first discontinuous reception mode such that the apparatus continues operation in the at least one awake period and disabling operation of the first discontinuous reception mode such that the apparatus continues operation in a second discontinuous reception mode.

16 Claims, 7 Drawing Sheets

(56) References Cited

FOREIGN PATENT DOCUMENTS

EP  3 079 436 A1  10/2016
EP  3079436 A1 * 10/2016 .......... H04W 72/042

OTHER PUBLICATIONS

R2-1809611 (Year: 2018).*
US 2010077234 A1 (NXP, B.V.) Mar. 25, 2010 (Mar. 25, 2010) decscriplion, paragraphs 0003, 0021-0036.
CN 101155355 A (Huawei Technologies Co., Ltd.) Apr. 2, 2008 (Apr. 2, 2008) the whole document.
US 2018146430 A1 (Microsoft Technology Licensing LLC) May 24, 2018 (May 24, 2018) the whole document.
"DRX Procedure for NR-U", Panasonic, 3GPP TSG-RAN WG2 Meeting #104, R2-1817181(resubmission of R2-811920), Nov. 2018, 4 pgs.
"Discontinuous reception in NR-Unlicensed", InterDigital Inc., 3GPP TSG-RAN WG2 NR AH1807 Meeting, R2-1809611, Jul. 2018, 3 pgs.

* cited by examiner

Providing to a user equipment operating in at least one awake period of a first discontinuous reception mode comprising at least one awake period and at least one sleep period, a first indication to perform at least one of:
pausing operation of the first discontinuous reception mode such that the user equipment continues operation in the at least one awake period; and
disabling operation of the first discontinuous reception mode such that the user equipment continues operation in a second discontinuous reception mode

APPARATUS, METHOD AND COMPUTER PROGRAM

CROSS REFERENCE TO RELATED APPLICATION

This patent application is a U.S. National Stage application of International Patent Application Number PCT/CN2019/074627 filed Feb. 2, 2019, which is hereby incorporated by reference in its entirety.

FIELD

The present application relates to a method, apparatus, system and computer program and in particular but not exclusively to discontinuous reception for New Radio-based access to unlicensed spectrum (NR-U).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for operating in a first discontinuous reception mode comprising at least one awake period and at least one sleep period, receiving, during operation in the at least one awake period, a first indication from a network to perform at least one of pausing operation of the first discontinuous reception mode such that the apparatus continues operation in the at least one awake period and disabling operation of the first discontinuous reception mode such that the apparatus continues operation in a second discontinuous reception mode.

The at least one awake period may be defined by an inactivity timer.

Means for pausing operation of the first discontinuous reception mode such that the apparatus continues operation in the at least one awake period may comprise means for suspending the inactivity timer and operating the apparatus as if the inactivity timer were running.

Means for pausing operation of the first discontinuous reception mode such that the apparatus continues operation in the at least one awake period may comprise means for running the inactivity timer until a buffer of the apparatus is emptied.

The buffer may be associated with a first logical channel group or a subset of a configured logical channel group.

The first logical channel group may comprise a logical channel of highest priority.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The apparatus may comprise means for receiving the first indication in a medium access control, MAC, control element, CE, or physical downlink control channel, PDCCH.

The apparatus may comprise means for pausing operation of the first discontinuous reception mode or disabling operation of the first discontinuous reception mode until a second indication is received.

The apparatus may comprise means for receiving the second indication in a MAC control element (CE) or PDCCH.

In a second aspect there is provided an apparatus comprising means for providing to a user equipment operating in at least one awake period of a first discontinuous reception mode comprising at least one awake period and at least one sleep period, a first indication to perform at least one of pausing operation of the first discontinuous reception mode such that the user equipment continues operation in the at least one awake period and disabling operation of the first discontinuous reception mode such that the user equipment continues operation in a second discontinuous reception mode.

The apparatus may comprise means for performing a listen before talk procedure to acquire a channel for a maximum channel occupancy period, determining that there is data to be transmitted to or from the user equipment at the end of the maximum channel occupancy period and providing the first indication to the user equipment based on the determination.

The at least one awake period may be defined by an inactivity timer.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The apparatus may comprise means for providing the first indication in a medium access control (MAC) control element (CE) or physical downlink control channel (PDCCH).

The apparatus may comprise means for providing a second indication in a MAC CE or PDCCH.

In a third aspect there is provided a method comprising operating in a first discontinuous reception mode comprising at least one awake period and at least one sleep period, receiving, during operation in the at least one awake period, a first indication from a network to perform at least one of pausing operation of the first discontinuous reception mode such that the apparatus continues operation in the at least one awake period and disabling operation of the first discontinuous reception mode such that the apparatus continues operation in a second discontinuous reception mode.

The at least one awake period may be defined by an inactivity timer.

Pausing operation of the first discontinuous reception mode such that the apparatus continues operation in the at least one awake period may comprise suspending the inactivity timer and operating the apparatus as if the inactivity timer were running.

Pausing operation of the first discontinuous reception mode such that the apparatus continues operation in the at least one awake period may comprise running the inactivity timer until a buffer of the apparatus is emptied.

The buffer may be associated with a first logical channel group or a subset of a configured logical channel group.

The first logical channel group may comprise a logical channel of highest priority.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The method may comprise receiving the first indication in a medium access control, MAC CE, or physical downlink control channel, PDCCH.

The method may comprise pausing operation of the first discontinuous reception mode or disabling operation of the first discontinuous reception mode until a second indication is received.

The method may comprise receiving the second indication in a MAC CE or PDCCH.

In a fourth aspect there is provided a method comprising providing to a user equipment operating in at least one awake period of a first discontinuous reception mode comprising at least one awake period and at least one sleep period, a first indication to perform at least one of pausing operation of the first discontinuous reception mode such that the user equipment continues operation in the at least one awake period and disabling operation of the first discontinuous reception mode such that the user equipment continues operation in a second discontinuous reception mode.

The method may comprise performing a listen before talk procedure to acquire a channel for a maximum channel occupancy period, determining that there is data to be transmitted to or from the user equipment at the end of the maximum channel occupancy period and providing the first indication to the user equipment based on the determination.

The at least one awake period may be defined by an inactivity timer.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The method may comprise providing the first indication in a medium access control, MAC, control element, CE, or physical downlink control channel, PDCCH.

The method may comprise providing a second indication in a MAC CE or PDCCH.

In a fifth aspect there is provided an apparatus comprising: at least one processor and at least one memory including a computer program code, the at least one memory and computer program code configured to, with the at least one processor, cause the apparatus at least to operate in a first discontinuous reception mode comprising at least one awake period and at least one sleep period, receive, during operation in the at least one awake period, a first indication from a network to perform at least one of pausing operation of the first discontinuous reception mode such that the apparatus continues operation in the at least one awake period and disabling operation of the first discontinuous reception mode such that the apparatus continues operation in a second discontinuous reception mode.

The at least one awake period may be defined by an inactivity timer.

The apparatus may be configured to suspend the inactivity timer and operating the apparatus as if the inactivity timer were running.

The apparatus may be configured to run the inactivity timer until a buffer of the apparatus is emptied.

The buffer may be associated with a first logical channel group or a subset of a configured logical channel group.

The first logical channel group may comprise a logical channel of highest priority.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The apparatus may be configured to receive the first indication in a medium access control, MAC, control element, CE, or physical downlink control channel, PDCCH.

The apparatus may be configured to pause operation of the first discontinuous reception mode or disable operation of the first discontinuous reception mode until a second indication is received.

The apparatus may be configured to receive the second indication in a MAC CE or PDCCH.

In a sixth aspect there is provided an apparatus comprising: at least one processor and at least one memory including a computer program code, the at least one memory and computer program code configured to, with the at least one processor, cause the apparatus at least to:

provide to a user equipment operating in at least one awake period of a first discontinuous reception mode comprising at least one awake period and at least one sleep period, a first indication to perform at least one of pausing operation of the first discontinuous reception mode such that the user equipment continues operation in the at least one awake period and disabling operation of the first discontinuous reception mode such that the user equipment continues operation in a second discontinuous reception mode.

The apparatus may be configured to perform a listen before talk procedure to acquire a channel for a maximum channel occupancy period, determine that there is data to be transmitted to or from the user equipment at the end of the maximum channel occupancy period and provide the first indication to the user equipment based on the determination.

The at least one awake period may be defined by an inactivity timer.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The apparatus may be configured to provide the first indication in a medium access control, MAC, control element, CE, or physical downlink control channel, PDCCH.

The apparatus may be configured to provide a second indication in a MAC CE or PDCCH.

In a seventh aspect there is provided a computer readable medium comprising program instructions for causing an apparatus to perform at least the following: operate in a first discontinuous reception mode comprising at least one awake period and at least one sleep period, receive, during operation in the at least one awake period, a first indication from a network to perform at least one of pausing operation of the first discontinuous reception mode such that the apparatus continues operation in the at least one awake period and disabling operation of the first discontinuous reception mode such that the apparatus continues operation in a second discontinuous reception mode.

The at least one awake period may be defined by an inactivity timer.

Pausing operation of the first discontinuous reception mode such that the apparatus continues operation in the at least one awake period may comprise suspending the inactivity timer and operating the apparatus as if the inactivity timer were running.

Pausing operation of the first discontinuous reception mode such that the apparatus continues operation in the at least one awake period may comprise running the inactivity timer until a buffer of the apparatus is emptied.

The buffer may be associated with a first logical channel group or a subset of a configured logical channel group.

The first logical channel group may comprise a logical channel of highest priority.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The apparatus may be caused to perform receiving the first indication in a medium access control, MAC, control element, CE, or physical downlink control channel, PDCCH.

The apparatus may be caused to perform pausing operation of the first discontinuous reception mode or disabling operation of the first discontinuous reception mode until a second indication is received.

The apparatus may be caused to perform receiving the second indication in a MAC CE or PDCCH.

In an eighth aspect there is provided a computer readable medium comprising program instructions for causing an apparatus to perform at least the following: providing to a user equipment operating in at least one awake period of a first discontinuous reception mode comprising at least one awake period and at least one sleep period, a first indication to perform at least one of pausing operation of the first discontinuous reception mode such that the user equipment continues operation in the at least one awake period and disabling operation of the first discontinuous reception mode such that the user equipment continues operation in a second discontinuous reception mode.

The apparatus may be caused to perform performing a listen before talk procedure to acquire a channel for a maximum channel occupancy period, determining that there is data to be transmitted to or from the user equipment at the end of the maximum channel occupancy period and providing the first indication to the user equipment based on the determination.

The at least one awake period may be defined by an inactivity timer.

The first discontinuous reception mode may be a long discontinuous reception mode and the second discontinuous reception mode may be a short discontinuous reception mode.

The second discontinuous reception mode may be a pre-configured discontinuous reception mode having a longer awake period and a shorter sleep period than the first discontinuous reception mode.

The apparatus may be caused to perform providing the first indication in a medium access control, MAC, control element, CE, or physical downlink control channel, PDCCH.

The apparatus may be caused to perform providing a second indication in a MAC CE or PDCCH.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 7 shows a flowchart of a method according to an example embodiment.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
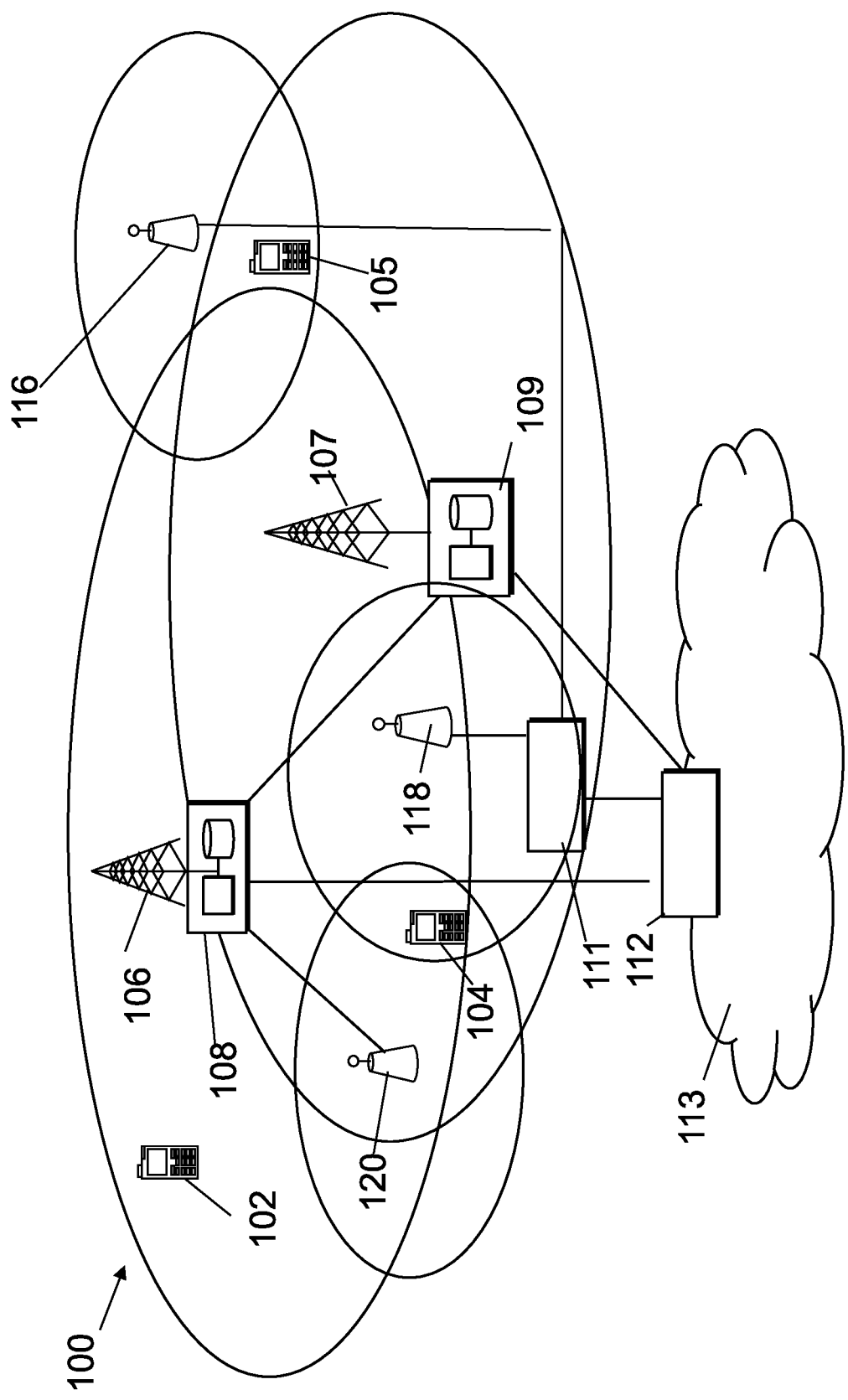
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
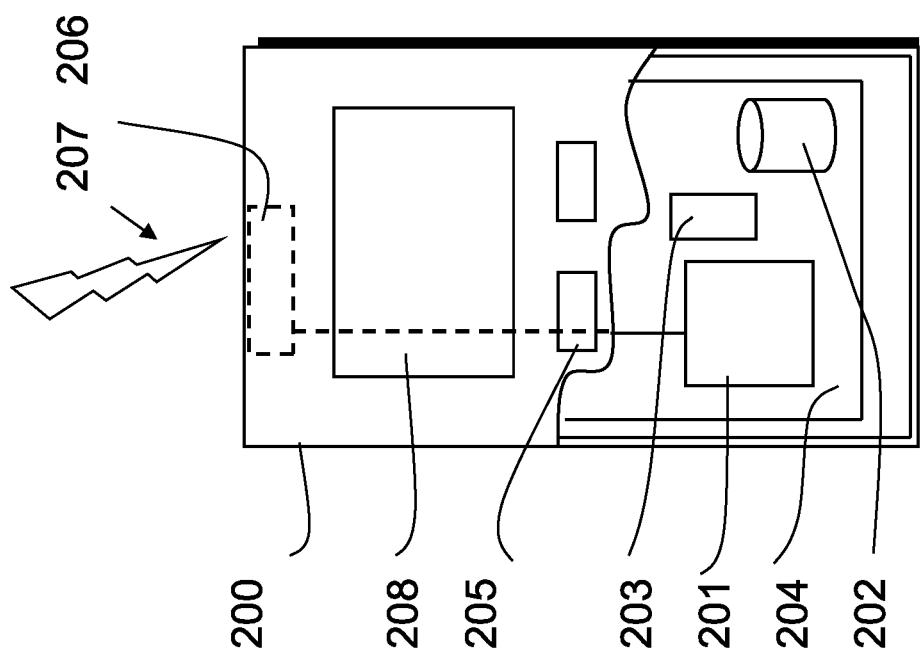
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
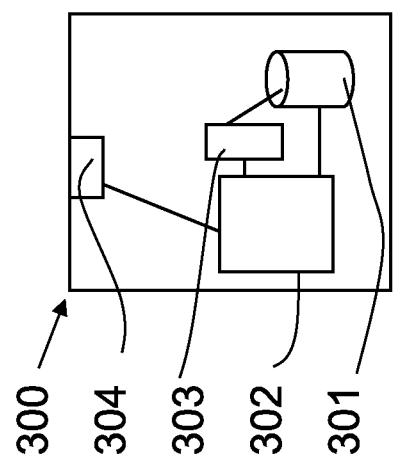
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

NR-based access to unlicensed spectrum (NR-U) is being considered. Discontinuous reception (DRX) is one of the MAC aspects that is being further studied.

To transmit in unlicensed spectrum, a transmitter first performs a Listen-Before-Talk (LBT) procedure. LBT is a procedure whereby radio transmitters first sense the medium and transmit only if the medium is sensed to be idle.

DRX functionality may be configured for an RRC_CONNECTED UE so that the UE does not need to continuously monitor the physical downlink control channel (PDCCH). In LTE and NR systems, discontinuous reception (DRX) may provide reasonable battery consumption of a UE.

In NR-U, due to the LBT mechanism, there is no guarantee that the channel on the unlicensed frequency is always available for a gNB to schedule the UE.

Figure 4:
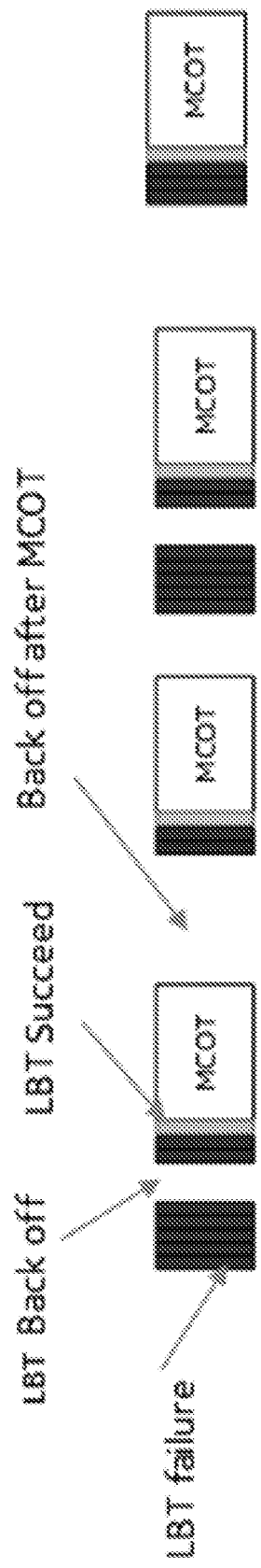
FIG. 4 shows a timeline of a transmitter performing an LBT procedure.

FIG. 4 illustrates a block diagram of an example LBT procedure. At first, a gNB performs an unsuccessful LBT procedure. The gNB then waits for a back off time. After the back off time, the gNB performs a successful LBT operation. The gNB is then able to acquire the channel. After successful LBT, the gNB may occupy the channel for a limited time duration (e.g. 8 ms for CAPC 3) due to the restriction given by the spectrum regulations.

A maximum channel occupancy time (MCOT) including downlink (DL) transmission from one eNB and uplink (UL) transmission to the same eNB is introduced. The MCOT is the time duration for which the transmitter may occupy the channel. A transmission sequence is defined as a number of subframes including possible partial subframes for DL and/or UL within a MCOT. The transmission in the first subframe among the transmission sequence is conducted after a Category 4 LBT. The transmission sequence within the MCOT may be initiated by either a DL transmission or an UL transmission.

Figure 5:
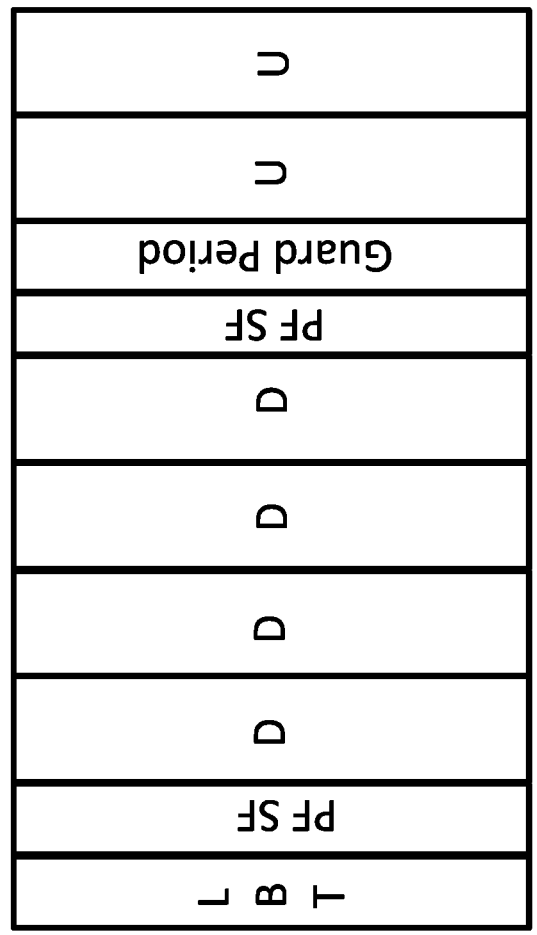
FIG. 5 shows a block diagram of a transmission sequence.

FIG. 5 shows an example of a whole MCOT, with 8 ms duration. The MCOT includes an LBT, four DL full subframes, two DL partial subframes, one guard period and two UL full subframes. In the first subframe, a gNB will perform a LBT procedure. If LBT succeeds, the gNB will transmit DL data in the remaining DL Partial subframe. In the following 4 DL full subframes, the gNB will transmit DL data consecutively. In the sixth subframe, the gNB will transmit DL data in partial subframe, and then enter the guard period for DL/UL switch. After the guard period, the UE will transmit UL data in the following two UL full subframes.

Table 1 lists the Channel Access Priority Classes that have been defined by 3GPP. The difference between the classes is the range of possible contention windows (CW) (defined by $CW_{min,p}$ and $CW_{max,p}$), the number of Clear Channel Assessment (CCA) slots in the window (defined by $m_p$), and Maximum Channel Occupancy Time ($T_{mcot,p}$).

TABLE 1

Channel Access Priority Classes

| Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A priority class with a lower number (as compared to one with a higher number) has a higher chance of acquiring the channel because the contention windows (CWs) have shorter duration. For example, using class 1 has a higher likelihood of grabbing the channel compared to class 3. However, using a priority class with a low number allows the transmitter to use the channel for a shorter period of time before it needs to give another transmitter the chance to transmit.

Thus, for NR-U, no activity for a long time does not always imply that there is no data to be sent. The lack of activity may be due to failed LBT procedures caused by congestion. This may impact the DRX operation.

In the current DRX mechanism defined for LTE and NR, a UE is awake for a given period and asleep for a given DRX period. If the UE detects scheduling in the awake period, an Inactivity timer starts running. When the Inactivity timer expires, the UE uses Short cycle DRX for a period of ShortCycleTimer and upon expiry of the ShortCycleTimer the UE uses Long cycle DRX, with the design principle of assuming no PDCCH reception means nothing for both DL and UL. But for NR-U, no PDCCH reception for a long period may be due to continuous LBT failure and using Long DRX leaves even less scheduling opportunity for the UE.

For example, after last available MCOT (e.g., 8 ms) of channel acquisition expires, the gNB would need to perform another LBT before continuing to schedule the UE. If there is no opportunity for transmission before the inactivity timer expires, UE will use short DRX, and then, if gNB experiences several LBT failures, long DRX Cycle. To provide the remaining data from the gNB that was not fully transmitted to the UE in the last available window, the gNB waits to the next OnDuration, where LBT failure might still happen. It may not be feasible to ensure that the OnDuration aligns with the available MCOT (e.g., 8 ms) of successful channel acquisition since the OnDuration is dynamic depending on data arrival for transmission as well as channel condition. Thus, an unpredictable delay may be caused by long DRX cycle working with NR-U.

It has been proposed that DRX be adapted for NR-U scheduling patterns taking LBT impact into account, e.g., UE determines channel acquisition based on reception of a signal indicating successful acquisition of the channel by the network and applies a certain DRX configuration depending on whether the UE has determined the gNB acquired the channel.

It has been proposed to switch between Short and Long DRX based on MAC CE and disable implicit switching based on timers.

Figure 6:
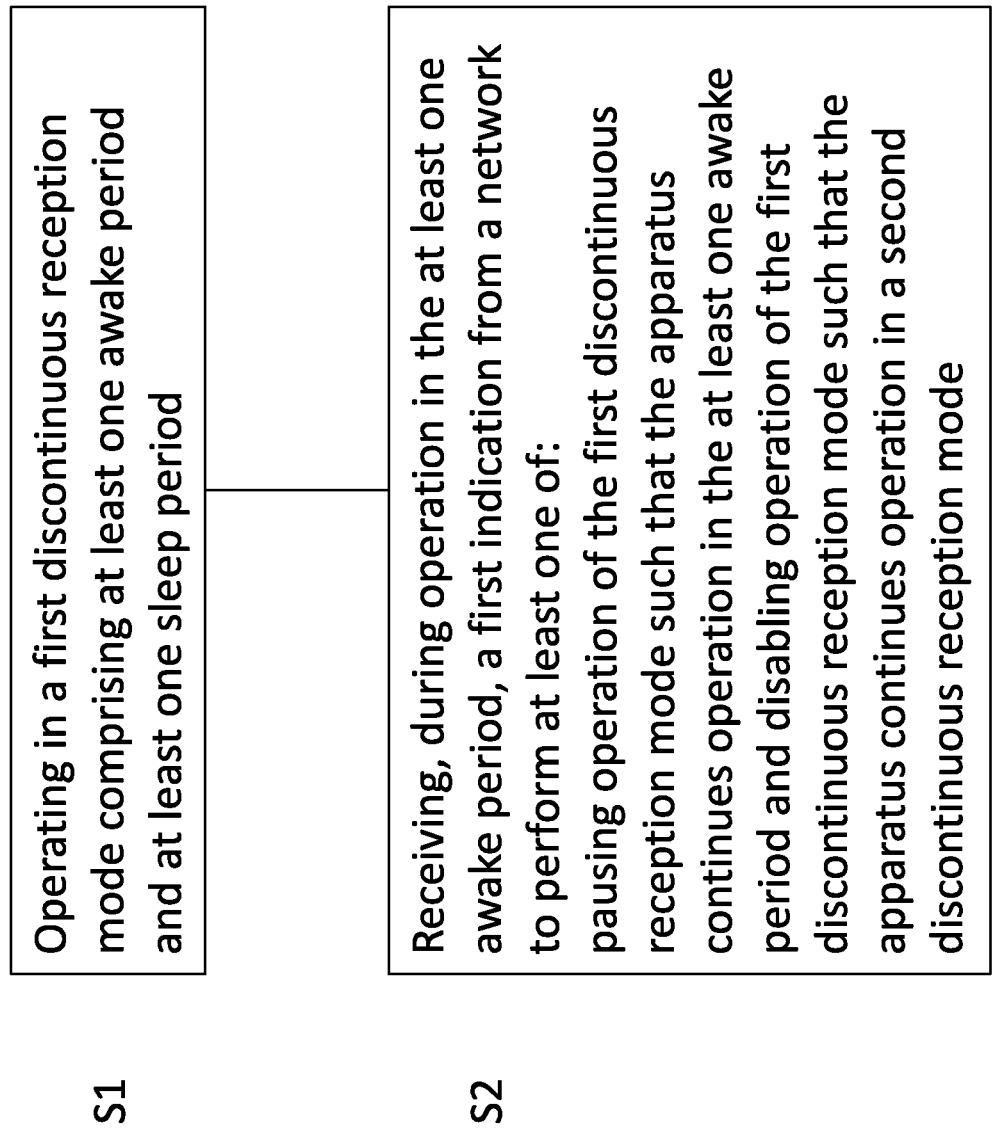
FIG. 6 shows a flowchart of a method according to an example embodiment.

FIG. 6 shows a flowchart of a method according to an example embodiment. The method may be performed at a user equipment. The UE may be configured to operate using NR-U.

In a first step, S1, the method comprises operating in a first discontinuous reception mode comprising at least one awake period and at least one sleep period.

In a second step, S2, the method comprises receiving, during operation in the at least one awake period, a first indication from a network to perform at least one of: pausing operation of the first discontinuous reception mode such that the apparatus continues operation in the at least one awake period and disabling operation of the first discontinuous reception mode such that the apparatus continues operation in a second discontinuous reception mode.

FIG. 7 shows a flowchart of a method according to an example embodiment. The method may be performed at a base station, e.g., gNB. The gNB may configured to perform an LBT procedure. The gNB may be configured to operate using NR-U.

In a first step, T1, the method comprises providing to a user equipment operating in at least one awake period of a first discontinuous reception mode comprising at least one awake period and at least one sleep period, a first indication to perform at least one of: pausing operation of the first discontinuous reception mode such that the user equipment continues operation in the at least one awake period and disabling operation of the first discontinuous reception mode such that the user equipment continues operation in a second discontinuous reception mode.

The first indication may be received in a MAC CE or PDCCH.

The method may comprise determining that there is data to be transmitted to or from the user equipment at the end of the maximum channel occupancy period. The first indication may be provided to the UE based on the determination. If, at the end of the MCOT, there is remaining data for DL in gNB or ULdata, based on the buffer status report (BSR), the gNB provides an indication to the UE to keep awake. The indication may be provided at the end of the DL Subframe(s) in the MCOT.

The at least one awake period is defined by an inactivity timer. Pausing operation of the first discontinuous reception mode may comprise suspending the inactivity timer and operating the apparatus as if the inactivity timer were running. That is, the UE may stay awake by suspending the inactivity timer and consider it still running, hence in active time.

Alternatively, pausing operation of the first discontinuous reception mode may comprise running the inactivity timer until a buffer of the apparatus is emptied. As long as the buffer of the UE contains data to transmit, the inactivity timer never expires. The user equipment may thus stay awake until data in a buffer is emptied. The buffer may be associated with a logical channel group (LCG), e.g., to the LCG containing the logical channel of highest priority, or to a subset of the configured LCG through RRC signaling.

In an alternative embodiment, operation of the first DRX mode is disabled such that the UE operates in a second DRX mode. The second DRX mode may be preconfigured at the UE. The pre-configured discontinuous reception mode may have a longer awake period and a shorter sleep period than the first discontinuous reception mode For example, upon reception of the first indication, the UE uses another, shorter, DRX pattern (e.g. Shorter DRX cycle, longer OnDuration) which is pre-configured at the UE.

Alternatively, the first discontinuous reception mode may be a long discontinuous reception mode and the second discontinuous reception mode be a short discontinuous reception mode. For example, the UE may disable long DRX cycle, e.g., by stopping the DRX short cycle timer.

The method may comprise pausing operation in the first discontinuous reception mode or disabling operation of the first discontinuous reception mode until a second timer expires or an indication is received. For example, the UE may pause operation in the first DRX mode until a next PDCCH without such an indication is received or until DRX Command MAC CE/a Long DRX Command MAC CE is received which causes the UE to use Short DRX or Long DRX.

The mechanisms may be limited to a subset of the Channel Access Priority Classes.

In an alternative embodiment, a method comprises, in a first step, operating in a first discontinuous reception mode comprising at least one awake period and at least one sleep period.

In a second step, the method comprises, on expiry of a first timer, operating in a second discontinuous reception mode comprising at least one awake period and at least one sleep period.

The method may comprise disabling the first DRX mode.

The first discontinuous reception mode may be a short DRX mode or a long DRX mode and the second DRX mode may be a non-DRX mode. The UE may, e.g., start the drx-InactivityTimer or re-defined Timer2 and stay awake.

The first DRX mode may be a short DRX mode and the second DRX mode may be a long DRX mode.

In the second example embodiment, at a pre-defined Timer1 expiry, if UE is in DRX status (Short DRX or Long DRX), UE automatically switches back to non-DRX (e.g., by starting the drx-InactivityTimer or pre-defined Timer2 and stays awake) if UE is in Short DRX or Long DRX; or short DRX (e.g., by starting the drxShortCycleTimer or pre-defined Timer2) if UE is in Long DRX.

After the timer (e.g., drx-InactivityTimer, drxShortCycleTimer or pre-defined Timer2) expired, if there is still no scheduling, the DRX cycle returns to to previous DRX cycle (Short DRX or Long DRX).

The Timer1 and Timer2 may be configurable and defined as a counter of number of DRX cycles used similar to the drxShortCycleTimer. It may also be possible to reuse drxShortCycleTimer.

The above methods may address LBT impact on DRX without defining new procedure and signaling for channel acquisition. The above methods may ensure a short delay when there is data to be transmitted. The methods may provide means to prevent a UE staying in long DRX cycle for too long which may reduce the delay of DL transmission.

The methods may be implemented in a user equipment as described with reference to FIG. 2 or a control apparatus as described with reference to FIG. 3.

An apparatus may comprise means for operating in a first discontinuous reception mode comprising at least one awake period and at least one sleep period, receiving, during operation in the at least one awake period, a first indication from a network to perform at least one of:

pausing operation of the first discontinuous reception mode such that the apparatus continues operation in the at least one awake period and disabling operation of the first discontinuous reception mode such that the apparatus continues operation in a second discontinuous reception mode.

Alternatively, or in addition, an apparatus may comprise means for providing to a user equipment operating in at least one awake period of a first discontinuous reception mode comprising at least one awake period and at least one sleep period, a first indication to perform at least one of pausing operation of the first discontinuous reception mode such that the user equipment continues operation in the at least one awake period and disabling operation of the first discontinuous reception mode such that the user equipment continues operation in a second discontinuous reception mode.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where LBT procedures and DRX are used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

Indeed, there is a further embodiment comprising a combination of one or more embodiments with any of the other embodiments previously discussed.

What is claimed is:

1. A method comprising:
operating in a first discontinuous reception mode comprising at least one awake period and at least one sleep period;
receiving, from a network, during operation in the at least one awake period, a first indication, indicating that data is to be transmitted to or from the apparatus at the end of a maximum channel occupancy period, to perform at least one of:
pausing operation of the first discontinuous reception mode such that the apparatus continues operation in the at least one awake period; or
disabling operation of the first discontinuous reception mode such that the apparatus continues operation in a second discontinuous reception mode.

2. A method comprising:
performing a listen before talk procedure to acquire a channel for a maximum channel occupancy period;
determining that data is to be transmitted to or from a user equipment at the end of the maximum channel occupancy period;
providing to the user equipment operating in at least one awake period of a first discontinuous reception mode comprising at least one awake period and at least one sleep period, a first indication, indicating that data is to be transmitted to or from the user equipment at the end of the maximum channel occupancy period, to perform at least one of:
pausing operation of the first discontinuous reception mode such that the user equipment continues operation in the at least one awake period; or
disabling operation of the first discontinuous reception mode such that the user equipment continues operation in a second discontinuous reception mode.

3. An apparatus comprising:
at least one processor; and
at least one non-transitory memory storing instructions, that when executed by the at least one processor, cause the apparatus at least to:
operate in a first discontinuous reception mode comprising at least one awake period and at least one sleep period;
receive, from a network, during operation in the at least one awake period, a first indication, indicating that data is to be transmitted to or from the apparatus at the end of a maximum channel occupancy period, from the network to perform at least one of:
pausing operation of the first discontinuous reception mode such that the apparatus continues operation in the at least one awake period; or
disabling operation of the first discontinuous reception mode such that the apparatus continues operation in a second discontinuous reception mode.

4. The apparatus as claimed in claim 1 where the at least one awake period is defined by an inactivity timer and the at least one processor and the at least one memory are configured to provide the pausing operation of the first discontinuous reception mode for suspending the inactivity timer and operating the apparatus as if the inactivity timer were running.

5. The apparatus as claimed in claim 3 where the at least one awake period is defined by an inactivity timer and the at least one processor and the at least one memory are configured to provide the pausing operation of the first discontinuous reception mode for running the inactivity timer until a buffer of the apparatus is emptied.

6. The apparatus as claimed in claim 5 where the buffer is associated with a first logical channel group or a subset of a configured logical channel group.

7. The apparatus as claimed in claim 6 where the first logical channel group comprises a logical channel of highest priority.

8. The apparatus as claimed in claim 3 where the first discontinuous reception mode is a long discontinuous reception mode and the second discontinuous reception mode is a short discontinuous reception mode.

9. The apparatus as claimed in claim 3 where the second discontinuous reception mode is a pre-configured discontinuous reception mode having a longer awake period and a shorter sleep period than the first discontinuous reception mode.

10. The apparatus as claimed in claim 3 where the apparatus comprises circuitry configured to receive the first indication in a medium access control, control element, or physical downlink control channel.

11. The apparatus as claimed in claim 3 where the apparatus comprises circuitry configured to pause operation of the first discontinuous reception mode or disabling operation of the first discontinuous reception mode until a second indication is received.

12. The apparatus as claimed in claim 11 where the apparatus comprises circuitry configured to receive the second indication in a medium access control control element or physical downlink control channel.

13. An apparatus comprising:
- at least one processor; and
- at least one non-transitory memory storing instructions, that when executed by the at least one processor, cause the apparatus at least to:
  - perform a listen before talk procedure to acquire a channel for a maximum channel occupancy period;
  - determine that data is to be transmitted to or from a user equipment at the end of the maximum channel occupancy period;
    - provide to the user equipment operating in at least one awake period of a first discontinuous reception mode comprising at least one awake period and at least one sleep period, a first indication, indicating that data is to be transmitted to or from the apparatus at the end of the maximum channel occupancy period, to perform at least one of:
      - pausing operation of the first discontinuous reception mode such that the user equipment continues operation in the at least one awake period; or
      - disabling operation of the first discontinuous reception mode such that the user equipment continues operation in a second discontinuous reception mode.

14. The apparatus according to claim 13 comprising circuitry configured to perform a listen before talk procedure to:
- acquire a channel for a maximum channel occupancy period;
- determine that there is data to be transmitted to or from the user equipment at the end of the maximum channel occupancy period; and
- provide the first indication to the user equipment based on the determination.

15. A non-transitory computer readable medium comprising program instructions for causing an apparatus to perform:
- operating in a first discontinuous reception mode comprising at least one awake period and at least one sleep period;
- receiving, from a network, during operation in the at least one awake period, a first indication, indicating that data is to be transmitted to or from the apparatus at the end of a maximum channel occupancy period, to perform at least one of:
  - pausing operation of the first discontinuous reception mode such that the apparatus continues operation in the at least one awake period; or
  - disabling operation of the first discontinuous reception mode such that the apparatus continues operation in a second discontinuous reception mode.

16. A non-transitory computer readable medium comprising program instructions for causing an apparatus to perform:
- performing a listen before talk procedure to acquire a channel for a maximum channel occupancy period;
- determining that data is to be transmitted to or from a user equipment at the end of the maximum channel occupancy period;
- providing to the user equipment operating in at least one awake period of a first discontinuous reception mode comprising at least one awake period and at least one sleep period, a first indication, indicating that data is to be transmitted to or from the user equipment at the end of the maximum channel occupancy period, to perform at least one of:
  - pausing operation of the first discontinuous reception mode such that the user equipment continues operation in the at least one awake period; or
  - disabling operation of the first discontinuous reception mode such that the user equipment continues operation in a second discontinuous reception mode.

* * * * *